Feb. 20, 1962  L. J. GOMBAR  3,021,632
FISH LURE ACCESSORY
Filed Jan. 21, 1960

INVENTOR.
LESLIE J. GOMBAR
BY Edward M. Apple
ATTORNEY 3,021,632
FISH LURE ACCESSORY
Leslie J. Gombar, 12591 Glenfield, Detroit 13, Mich.
Filed Jan. 21, 1960, Ser. No. 3,764
2 Claims. (Cl. 41—10)

This invention relates to fishing tackle and has particular reference to a device for attachment to almost any type of fish lure to make the lure more attractive to fish.

An object of the invention is to generally improve fish lures, whether they be plugs, spoons, spinners, chugging weights, flies, nymphs, plain hooks, or the like.

Another object of the invention is to provide an accessory in the nature of a skirt for a fish lure, which may be economically manufactured, easily attached to the lure and one which greatly improves the inherent characteristics of the lure, because it has wide application, great light and color reflective capacity, and universal action to arouse the curiosity and fighting instincts of the fish.

Another object of the invention is to provide a device of the character indicated, which may be assembled from conventional materials obtainable on the open market.

The foregoing and other objects and advantages of the invention will become more apparent as the description proceeds, reference being made from time to time to the accompanying drawing, forming part of the within disclosure, in which drawing.

Figure 1:
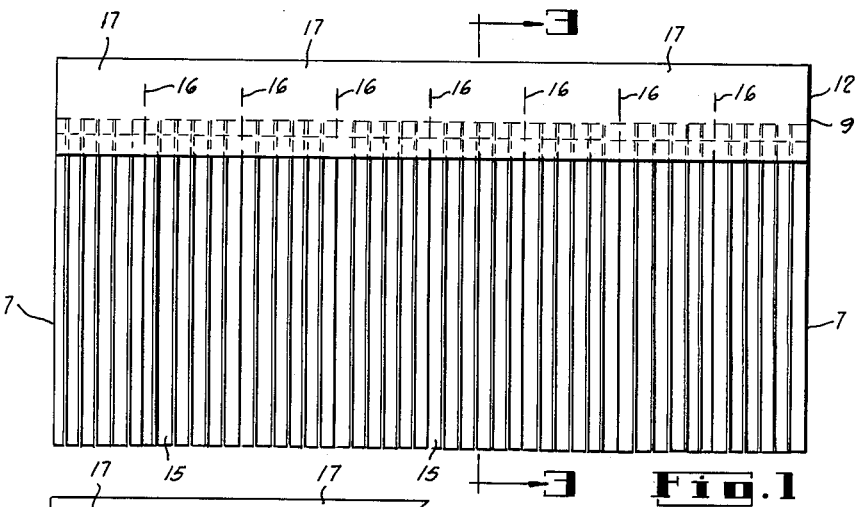
FIG. 1 is a plan view of a sheet of material from which a plurality of devices embodying the invention may be formed.

In practicing my invention, I secure on the open market, suitable rolls, or sheets, of metalized plastic sheet film, which may be of silver, gold, or other suitable color. The large rolls or sheets are first cut into smaller roll or sheet widths, which roll or sheet widths will ultimately provide the approximate length of a finished product. The material comprising the smaller roll, or sheet, is again cut into suitable pieces 7 and 8 (FIGS. 1 and 2), each of which provides sufficient material for the main portions of a number of the finished products.

The pieces 7 and 8 (FIGS. 1, 2, and 3), are then provided along the upper front edges with a strip of plastic material 9, which is preferably of a different color and has a layer of adhesive 10 on one surface, part of which adhesive 10 engages the upper edge 11 of the piece 7 or 8, and part of which adhesive contacts a second decorative backing strip 12, made of a plastic coated paper, or vinyl, or the like.

Figure 2:
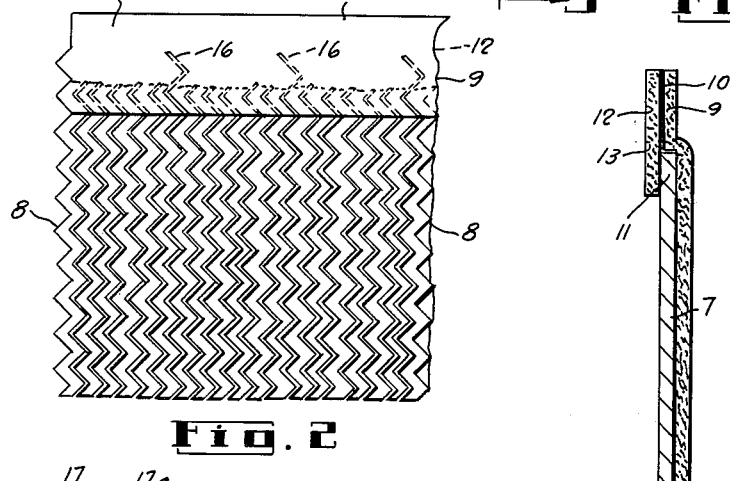
FIG. 2 is a plan view of a modified form of sheet embodying the invention.

It will be noted in FIGS. 1 and 2, that each piece 7 and 8 is cut, or shredded, into a plurality of narrow ribbons 15, either having straight edges, as shown in FIG. 1, or serrated edges, as shown in FIG. 2. It also will be noted, that approximately every sixth cut 16, extends almost through the adhesive strip 9, and the decorative backing strip 12. This is done so that a plurality of the finished products 17 (FIGS. 4 and 5), may be handled in strip form, for commercial display, or storage purposes. Each finished product 17 comprises the area between two of the cuts 16 (FIG. 1). The cuts 16 can be varied in spacing to provide larger or smaller finished products.

When it is desired to use one of the finished devices 17, it is first severed along the line 16 from the others (FIG. 1). The backing strip 12 is then removed by grasping the non-adhesive portion 13 and stripping off the decorative backing strip 12, and by exposing the adhesive 10 above the piece 7, so that the piece 7 can then be applied to a fish lure body 14 (FIG. 4), or 15 (FIG. 5) in the nature of a skirt for the purposes intended.

Figure 3:
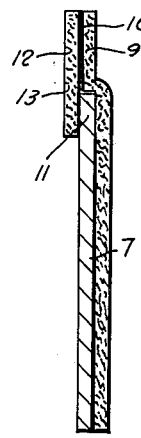
FIG. 3 is a section taken substantially on the line 3—3 of FIG. 1.
Figure 4:
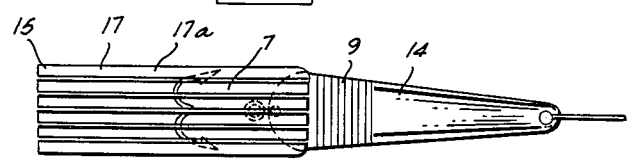
FIG. 4 is a plan view of a spoon type of fish lure, to which has been added one of the devices embodying the invention.

In FIG. 4, I illustrate one of the decorative strips 7 applied to a conventional spoon type fish lure 14. In this embodiment, the area 9 has the adhesive 10, on the back, which adhesive 10 has previously been uncovered by the removal of the backing strip 12 (FIG. 3). The exposed adhesive portion 10 of the strip 9 is then secured to the fish lure in the area indicated by the reference character 9, leaving the shredded portion 17a free to move in the water for the intent and purposes hereinabove indicated.

Figure 5:
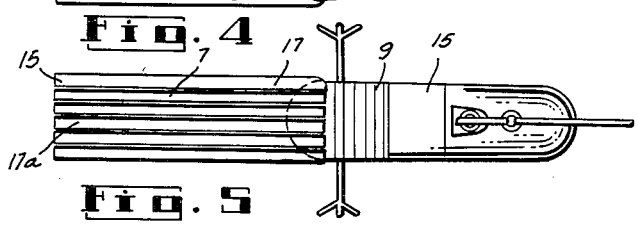
FIG. 5 is a plan view of a flat fish type of fish lure to which has been added one of the devices embodying the invention.

In FIG. 5, I illustrate one of the skirt-like elements 17 attached to the body of a flat fish lure 15. In this embodiment, the skirt-like element 17a is attached to the fish lure 15 throughout the area 9 (FIG. 5), by means of the adhesive, as previously described. The skirt-like elements 17 may be attached to any type of a fish lure and will perform in the same manner as hereinabove indicated.

It is believed that the operation of the device is obvious from the foregoing description.

Having described my invention what I claim and desire to secure by Letters Patent is:

1. An accessory for a fish lure comprising a length of colored, metalized, plastic material, a strip of adhesive material secured along one edge of said length of plastic material and extending beyond the said edge, and a backing strip of plastic coated material freely overlying said edge of the said first named length of plastic material and in adhesive contact with the extending portion of said adhesive strip, there being a plurality of longitudinal slits in said first named length of plastic material extending at least to said adhesive strip.

2. The structure of claim 1, in which certain of said slits extend substantially through said adhesive strip and said backing strip.

References Cited in the file of this patent

UNITED STATES PATENTS

| | | |
|---|---|---|
| 2,161,094 | Saunders | June 6, 1939 |
| 2,171,544 | Doty et al. | Sept. 5, 1939 |
| 2,365,502 | Weesner | Dec. 19, 1944 |
| 2,613,991 | Schindler | Oct. 14, 1952 |
| 2,633,440 | Scholl | Mar. 31, 1953 |
| 2,702,580 | Bateman | Feb. 22, 1955 |

FOREIGN PATENTS

| | | |
|---|---|---|
| 1,167,861 | France | Aug. 18, 1958 |